US007486000B1

(12) United States Patent
Hacsi

(10) Patent No.: US 7,486,000 B1
(45) Date of Patent: Feb. 3, 2009

(54) DIELECTROPHORETIC HEAT ENGINE AND METHOD OF ENERGY CONVERSION

(76) Inventor: James Scott Hacsi, 13 Dartmouth Ave., Pueblo, CO (US) 81005

( * ) Notice: Subject to any disclaimer, the term of this patent is extended or adjusted under 35 U.S.C. 154(b) by 438 days.

(21) Appl. No.: 11/490,757

(22) Filed: Jul. 22, 2006

(51) Int. Cl.
    *H01L 41/00* (2006.01)
    *H02N 1/00* (2006.01)
    *F01K 25/00* (2006.01)

(52) U.S. Cl. .................. 310/309; 310/311; 322/2 R; 322/2 A; 290/1 R; 60/516; 60/721

(58) Field of Classification Search ............ 310/309, 310/311, 339; 60/508, 512, 513, 515, 516, 60/530, 643, 645, 650, 655, 682, 721; 62/6, 62/118, 467; 290/1 R; 322/2 R, 2 A
See application file for complete search history.

(56) References Cited

U.S. PATENT DOCUMENTS

| 3,243,687 | A | | 3/1966 | Hoh | |
|---|---|---|---|---|---|
| 4,114,380 | A | * | 9/1978 | Ceperley | 60/721 |
| 4,220,906 | A | * | 9/1980 | Drummond | 322/2 A |
| 5,598,704 | A | * | 2/1997 | Sidaway | 60/516 |
| 5,644,184 | A | * | 7/1997 | Kucherov | 310/306 |
| 6,978,611 | B1 | * | 12/2005 | Landis | 60/513 |
| 2005/0225213 | A1 | * | 10/2005 | Richards et al. | 310/339 |
| 2008/0061560 | A1 | * | 3/2008 | Peacock | 290/1 R |

* cited by examiner

*Primary Examiner*—Thomas M Dougherty

(57) ABSTRACT

A dielectrophoretic heat engine with temperature-dependent dielectric matter and energy conversion method exploiting the thermodielectrophoretic effect for effectively and efficiently converting thermal energy into work or other useful forms at any physical size or scale.

15 Claims, 2 Drawing Sheets

DIELECTROPHORETIC HEAT ENGINE AND METHOD OF ENERGY CONVERSION

CROSS-REFERENCE TO RELATED APPLICATIONS

Not applicable

STATEMENT REGARDING FEDERALLY SPONSORED RESEARCH

Not applicable

SEQUENCE LISTING OR PROGRAM

Not applicable

BACKGROUND OF THE INVENTION

1. Field of the Invention

The present invention relates to thermodynamic heat engines and heat cycles for the conversion of heat or thermal energy directly into work or more useful forms.

2. Description of Prior Art

As sensors and actuators become smaller, there is a continuing and growing need for micro-power sources that efficiently convert heat energy into more useful forms at very small physical scales. The technology to build extremely small heat engines is available, but there are currently no heat engines or heat cycles that work efficiently, if at all, at such small physical dimensions.

Fossil fuels are a non-renewable energy source that must be used wisely. Unfortunately, all known and currently available heat engines and thermodynamic heat cycles prevent the efficient conversion of energy from valuable non-renewable resources. That means we are consuming precious, non-renewable energy resources today in inefficient thermodynamic processes and whatever energy is wasted in those processes is lost forever.

Some ferroelectric materials, such as barium titanate (BT) and lead zirconate titanate (PZT), experience a drastic change in the dielectric constant, or relative permittivity, when heated to a temperature, called a Curie point, of the particular material. The dielectric constant increases in magnitude very rapidly just before the Curie temperature is reached, and it drops again sharply as the temperature increases further. There have been attempts in the past to use this characteristic of ferroelectric materials for the conversion of heat directly into electricity where the ferroelectric material is used as the dielectric in a parallel-plate capacitor. Hoh describes and claims in U.S. Pat. No. 3,243,687 dated Mar. 29, 1966 and entitled "Energy Converter" an invention exploiting what was defined as the "thermo-dielectric effect" which utilizes the rise or fall in the dielectric constant of dielectric matter in a capacitor as it is heated or cooled. Hoh anticipated using the increase or decrease in voltage and thus, the amount of energy gained in an energized capacitor with isolated electric charges when it is heated or cooled for the direct conversion of thermal energy into electricity. Ferroelectric direct-conversion devices of this nature are impractical because a capacitor that has a dielectric with temperature-dependent permittivity must be physically moved through a heat cycle. Some devices even require a cyclical heat source. Moreover, the conversion efficiency of such devices is very low because getting heat effectively into and out of the dielectric material of the capacitor has proven to be a difficult task.

3. Objects and Advantages

It would therefore be advantageous to provide a heat engine that does not require a cyclical heat source, has a minimum of moving parts, and converts thermal energy into kinetic energy or more useful forms very efficiently at even the smallest physical scales. Moreover, it would also be advantageous to provide a heat engine and heat cycle using the wide variation of the dielectric constant, or relative permittivity, of certain materials around a Curie temperature that results from heating or cooling the materials. A heat engine that first converts thermal energy efficiently into motion or kinetic energy would also be advantageous over the less efficient methods available for converting thermal energy directly into electricity.

A dielectrophoretic heat engine uses the extreme variation in the dielectric constant of a ferroelectric material, such as barium titanate (BT) or lead zirconate titanate (PZT), at temperatures near a Curie point, or a Curie temperature, of the material, but in a different and more efficient way to convert heat energy directly into mechanical energy. Simply put, a capacitor that has a dielectric with temperature-dependent permittivity is not physically moved through a heat cycle to produce electricity as was done previously, but the dielectric moves instead under the influence of an electric field in a different heat cycle, and the resultant kinetic energy of the moving dielectric can then be converted to electricity. Adequate explanation of the dielectrophoretic heat engine and associated heat cycle, which are the objects of the present invention, requires a definition and understanding of a new principle. The "thermodielectrophoretic effect" is hereby defined as the tendency of an electric field to attract and draw in matter with a temporary higher relative permittivity, while simultaneously rejecting or displacing other matter with a temporary lower relative permittivity from the same electric field, where the variance in relative permittivity between the two sections of matter is caused by a temporary temperature difference between the sections of matter. In other words, dielectric matter with a temperature-dependent permittivity is used as the working substance in a heat engine where the heat cycle consists of heating and cooling sections of the dielectric matter so that sections of dielectric matter with a temporary higher permittivity are drawn into an electric field while other sections of dielectric matter with a temporary lower permittivity are simultaneously displaced from the same electric field. The result of the drawing in or displacement of, sections of dielectric matter with a temperature-dependent permittivity results in a net movement or motion in one direction of the dielectric matter into and through the electric field.

Consider the example of a square parallel-plate capacitor in which a square dielectric plate is inserted part way into the gap between the electrode plates. Using the conventional approximate equations for the properties of a parallel-plate capacitor, it can readily be shown that the electrostatic field pulls the dielectric slab toward a central position in the gap with a force, F, given by $$F = V^2(e_1 - e_2)a/2d,$$

where V is the potential applied between the electrode plates, $e_1$ is the permittivity of the dielectric slab being drawn into the electric field, $e_2$ is the permittivity of air that is being displaced from between the electrodes, a is the length of an electrode plate, and d is the thickness of the gap between the plates. Typically, the force is small from a macroscopic human perspective. However, the above equation shows that the force depends on the ratio between the capacitor dimensions but does not depend on the size. In other words, the force remains the same if the capacitor and the dielectric slab are shrunk to very small dimensions (nanometer size). At the same time, the masses of all components are proportional to the third power of their linear dimensions. Therefore, the force-to-mass ratio and, consequently, the acceleration that can be imparted to the dielectric slab are much larger at very small physical scales than at the macroscopic scale. The present invention exploits this effect, and thus, engines can be built that are more powerful, efficient, and effective than other heat engines at very small physical scales. Certain substances, such as barium titanate (BT) and lead zirconate titanate (PZT), exhibit a temperature-dependent permittivity near a Curie temperature, $T_c$. For that matter, the permittivity varies greatly within a span of a few degrees above or below $T_c$. Furthermore, the Curie temperatures of some substances can be permanently altered with the addition of certain quantities of other substances, such as lead or strontium. Usually, the addition of lead increases the Curie temperature, and the addition of strontium tends to decrease the Curie temperature. That means a variety of substances can be made by doping which exhibit a continuum of Curie temperatures ranging from extremely high temperatures down to room temperature or below. The present invention exploits the concept of temperature-dependent permittivity along with the ability to create substances where each substance exhibits a different $T_c$ in order to increase conversion efficiency by cascading heat engine stages where each stage uses dielectric matter with a slightly different Curie temperature as the working substance.

4. Objects and Advantages

Accordingly, besides the objects and advantages of the heat engine and associated heat cycle as described above, several advantages of the present invention are:

(a) to provide heat engines capable of converting heat with relatively small variations in temperature directly into mechanical energy or motion;

(b) to provide heat engines that have multiple stages with working fluid material used in the engine having different Curie temperatures in order to attain very high Carnot efficiencies;

(c) to provide simple heat engines which have relatively few moving parts and which can be produced cost-effectively;

(d) to provide heat engines that can be constructed to operate at any physical scale;

(e) to provide relatively powerful heat engines which are cost-effective, lightweight, and small;

(f) to provide heat engines capable of converting low-grade heat near room temperatures directly into mechanical energy or motion;

(g) to provide means and methods of cooling electronic circuits and components with very small dimensions;

(h) to provide means and methods for pumping or moving matter very efficiently at small physical scales.

SUMMARY

In accordance with the present invention, a dielectrophoretic heat engine is provided that operates on a novel thermodynamic heat cycle which exploits the thermodielectrophoretic effect as defined herein for converting heat or thermal energy directly into work or more useful forms even at very small physical scales for the purposes of cooling, pumping, or moving matter, and for producing electricity, more effectively and efficiently.

DRAWING FIGURES

DRAWINGS

Reference Numerals

Figure 1:
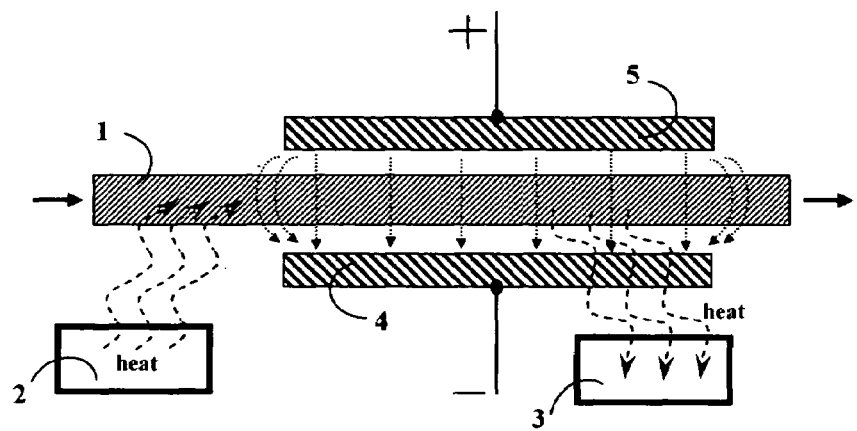
FIG. 1 illustrates basic components needed in a heat engine for converting heat into mechanical energy or motion by exploiting the thermodielectrophoretic effect.

1 Flexible dielectric ribbon comprised of matter with temperature-dependent permittivity
2 Heat source
3 Heat sink
4 Negatively-charged electrode
5 Positively-charged electrode
6 Rotatable table comprised of a thin-film ring of dielectric matter with temperature-dependent permittivity permanently bonded to negatively-charged electrode-wheel
7 Voltage source
8 Center pivot or hub
9 Brace to hold the positively-charged electrode
10 Stationary base
11 Means for converting kinetic energy to work or other useful forms

DETAILED DESCRIPTION OF THE DRAWING FIGURES

FIG. 1 shows the basic components needed in a heat engine that exploits the thermodielectrophoretic effect. A negatively-charged electrode 4 and a positively-charged electrode 5 are energized by a voltage source 7. A dielectric ribbon comprised of matter with temperature-dependent permittivity 1, such as barium titanate or lead zirconate titanate, fills the gap between the negatively-charged electrode 4 and the positively-charged electrode 5. Heat is supplied by a heat source 2 and a heat sink 3 absorbs waste heat from the dielectric ribbon 1. The heat source 2 is comprised of a means for raising the temperature and thus altering the dielectric constant of the dielectric matter comprising the dielectric ribbon 1. Thus, the heat source is comprised of a means for supplying thermal energy of any sort which includes, but is not limited to, electromagnetic energy, such as microwaves, gamma rays, or any other heat, such as low-grade waste heat from other thermodynamic processes.

Figure 2:
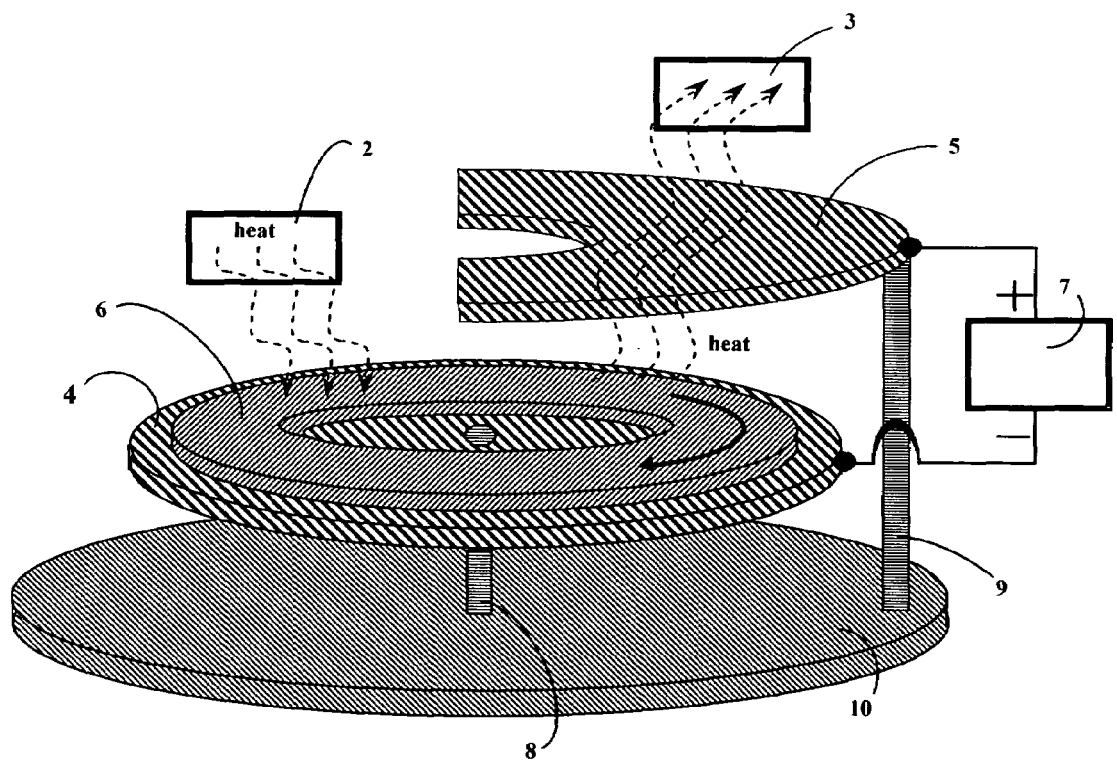
FIG. 2 shows a heat engine as a preferred embodiment of the present invention which exploits the thermodielectrophoretic effect for converting heat or thermal energy into mechanical energy or motion.

FIG. 2 shows a basic heat engine which is a preferred embodiment of the present invention. A rotatable table 6 comprised of a thin-film, ring of solid dielectric matter with a temperature-dependent permittivity, such as barium titanate or lead zirconate titanate, which is permanently deposited and bonded onto the negatively-charged electrode 4 that is formed into a wheel. The rotatable table 6 is free to rotate about the center pivot or hub 8 and sits above the stationary base 10. A metallic, positively-charged electrode 5 in the form of a thin half-ring, or half-round plate, sits above the rotatable table 6. The positively-charged electrode 5, or thin half-ring, is held in position by a brace 9 so that it is permanently fixed and sits above the rotatable table 6. Notice also that the spaces and distances between components of the heat engine as shown in the figure are exaggerated for description clarity. The rotatable table 6 will actually sit much closer to the stationary base 10, and the half-round, positively-charged electrode 5 will be fixed in a position slightly above the rotatable table 6 to reduce friction.

Figure 3:
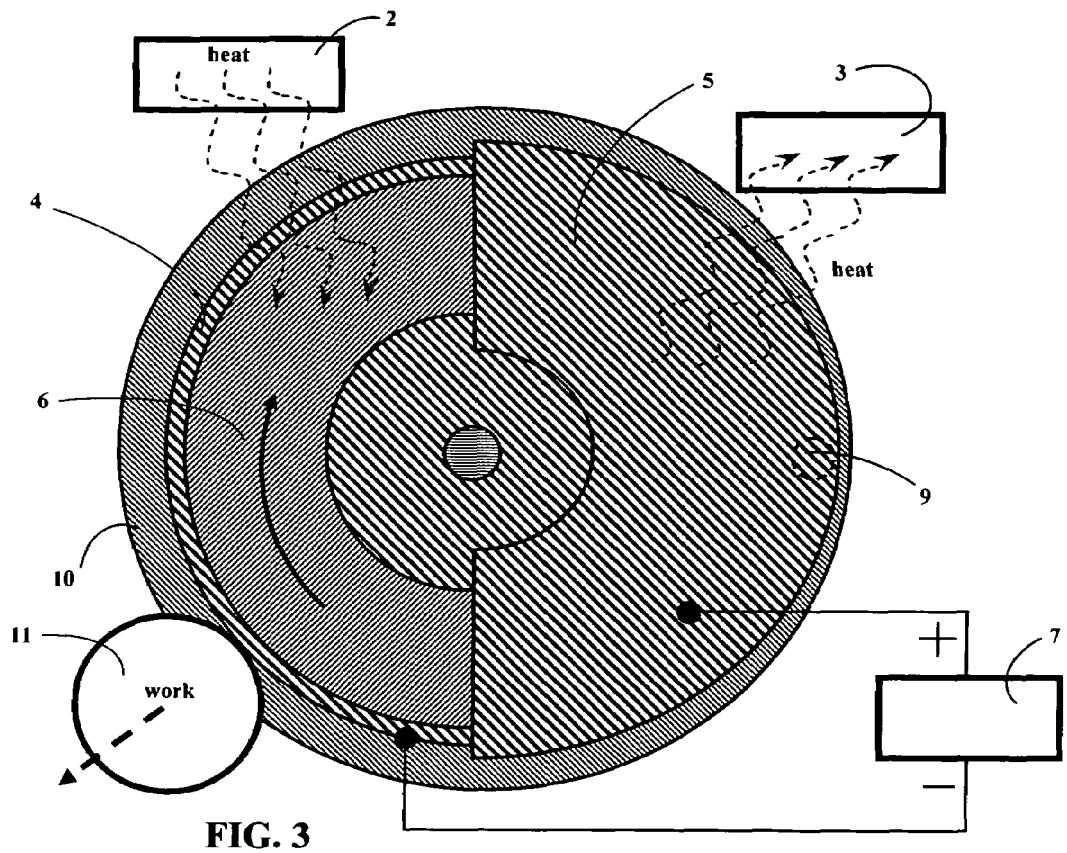
FIG. 3 shows a top view of the components of the heat engine which is a preferred embodiment of the present invention. Also shown is a means for converting kinetic energy of the rotating table to work or other useful forms.

FIG. 3 shows a top view of the components of the same engine known as a preferred embodiment of the present invention. Also shown is a means for converting kinetic energy of the rotating table to work or other useful forms.

Figure 4:
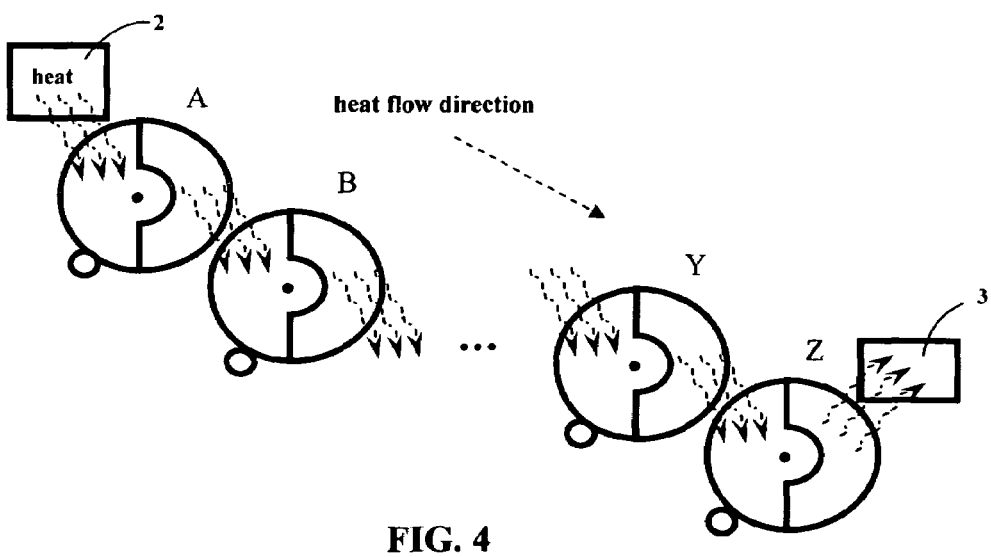
FIG. 4 illustrates the cascading of stages of a dielectrophoretic heat engine in order to increase theoretical and operational efficiencies.

FIG. 4 illustrates the method of cascading dielectrophoretic heat engine stages for improving efficiency.

OPERATION

In FIG. 1, a basic heat engine is shown that exploits and demonstrates the thermodielectrophoretic effect. A negatively-charged electrode 4 and a positively-charged electrode 5 are energized by the voltage source 7. Dielectric matter with temperature-dependent permittivity, such as barium titanate or lead zirconate titanate, in the form of a thin dielectric ribbon 1 fills the gap between the negatively-charged electrode 4 and the positively-charged electrode 5. The dielectric ribbon 1 is free to move and is electrically affected by the electric field established between the negatively-charged electrode 4 and the positively-charged electrode 5. When heat from the heat source 2 is applied to the dielectric ribbon 1 as shown, the heated section of dielectric ribbon 1 will experience a large increase in permittivity where the permittivity increase is localized to that particular section of the dielectric ribbon 1. In other words, the heated sections become more susceptible to polarization than when they were cooler. Heat is applied to raise the temperature of the dielectric ribbon 1 to a temperature just below the Curie point where a very sharp rise in permittivity occurs within an interval of a few degrees. On the other hand, other sections of the dielectric ribbon 1 which are already positioned inside the gap between the negatively-charged electrode 4 and the positively-charged electrode 5 are much cooler resulting in a drop in permittivity localized to those particular sections of the dielectric ribbon 1. As the temperature of the cooled sections inside the gap drops even a few degrees, the permittivity of those particular sections inside the electrode-gap will drop sharply. Sections of dielectric ribbon 1 inside the electrode-gap are cooled by removing heat from the dielectric ribbon 1 and then discharging the waste heat to the heat sink 3. The electric field will continue to draw in heated sections of the dielectric ribbon 1 due to the temporary high relative permittivity of those heated sections just outside the gap between the negatively-charged electrode 4 and the positively-charged electrode 5. Cooled sections of the dielectric ribbon 1 will simultaneously be displaced from inside the electrode-gap by the electric field between the negatively-charged electrode 4 and the positively-charged electrode 5 to make room for hotter sections of the dielectric ribbon 1 with a much higher permittivity. This is because the electric field has a greater tendency to draw in heated sections of dielectric ribbon 1 with a much greater permittivity to fill the electrode-gap than it does to hold the cooler sections of dielectric ribbon 1 with much lower permittivity. A continuous, net motion of the dielectric ribbon 1 due to the force on the dielectric ribbon 1 will occur as long as heat is applied from the heat source 2 to the dielectric ribbon 1 just before and outside the gap between the negatively-charged electrode 4 and the positively-charged electrode 5. Heated sections of the dielectric ribbon 1 near enough to the end, fringed electric lines of force present across the electrode-gap will be drawn toward and into the electrode-gap. The dielectric ribbon 1 will move more rapidly if the sections of dielectric ribbon 1 inside the gap between the negatively-charged electrode 4 and the positively-charged electrode 5 are cooled at a faster rate. Thus, by applying heat to the dielectric ribbon 1 just before the dielectric ribbon 1 enters the gap between the negatively-charged electrode 4 and the positively-charged electrode 5, a net motion of the dielectric ribbon 1 will result as heated sections of dielectric ribbon 1 are drawn into the electric field. Net motion of the dielectric ribbon 1 can be enhanced and sustained if waste heat from sections of the dielectric ribbon 1 inside the gap between the negatively-charged electrode 4 and the positively-charged electrode 5 is more readily discharged to the heat sink 3.

In FIG. 2 and FIG. 3, a heat engine known as a preferred embodiment of the present invention is illustrated. This heat engine incorporates a rotatable table 6 comprised of a negatively-charged electrode in the form of a wheel having a thin-film ring of dielectric matter with a temperature-dependent permittivity permanently bonded to the top surface. The thin-film ring of dielectric matter, such as barium titanate or lead zirconate titanate, is the working fluid in this heat engine. Heat can be added to, or removed from, the thin-film ring of dielectric matter much easier with this design than if a thicker table of dielectric matter were used instead. Furthermore, the metal wheel, which in this case is also the negatively-charged electrode, is used to support the thin-film ring of dielectric matter which would most likely be too brittle and inflexible if it were much thicker and had to support itself. A pivot 8 supports the rotatable table 6 and holds it above the stationary base 10 so the rotatable table 6 can move freely and without much frictional resistance. Heat is applied to the rotatable table 6 at a point just outside one end of the stationary, half-round, positively-charged electrode 5 so that when heated to a temperature near the Curie point, the affected sections of the rotatable table 6 will experience a large increase in permittivity. Since the dielectric matter is permanently bonded to the full-round, negatively-charged electrode wheel, the entire rotatable table 6 will spin in an attempt to align the heated sections of dielectric matter into a position directly under the stationary, half-round, positively-charged electrode 5. Cooler sections of dielectric matter with decreased permittivity will be less affected by the electric field established between the negatively-charged, electrode-wheel of the rotatable table 6 and the fixed, half-round, positively-charged electrode 5. Therefore, as heat is applied from the heat source 2 to the appropriate point on the rotatable table 6, which is near one end of the half-round, positively-charged electrode 5, the rotatable table 6 will spin. The rate of motion or spin will depend on how rapidly heat is removed from the sections of dielectric matter already positioned inside the gap formed between the bottom part of the rotatable table 6, or the negatively-charged electrode, and the top, fixed, half-round, positively-charged electrode 5. The rotatable table 6 will obviously spin faster as the appropriate sections of dielectric matter inside the electrode-gap are more rapidly cooled with waste heat being discarded to the heat sink 3. The force and torque experienced by the rotatable table 6 depends on the voltage placed on the two oppositely-charged electrodes by the voltage source 7, the thickness and diameter of the thin-film ring of dielectric matter bonded to the rotatable table 6, the effective surface area common to the two oppositely-charged electrodes, and the temperature or permittivity differentials that are established between heated and cooled sections of the rotatable table 6. Notice that the force depends on the ratio between capacitor dimensions, but does not depend on the size of the components. In other words, the force remains the same if the components of the heat engine are shrunk to very small dimensions (nanometer size). At the same time, the masses of all components are proportional to the third power of their linear dimensions. Therefore, the force-to-mass ratio and, consequently, the acceleration that can be imparted to the rotatable table 6 are much greater at very small physical scales than at the macroscopic scale. Again, the spaces and distances between components of the heat engine as shown in FIG. 2 are exaggerated for description clarity. The rotatable table 6 will actually sit closer to the stationary base 10, and the half-round positively-charged electrode 5 will be fixed in a position slightly above the rotatable table 6 to reduce friction. However, it is conceivable that the top electrode can actually make slight contact with the thin-film ring of dielectric matter on the rotatable table 6. The non-conductive, thin-film ring of dielectric matter serves to electrically separate the positively-charged electrode 5 and the negatively-charged electrode-wheel of the rotatable table 6. In summarizing, heat is applied from a heat source 2 to appropriate sections of a thin-film ring of temperature-dependent, dielectric matter permanently bonded to a metallic, negatively-charged electrode wheel, which together comprise the rotatable table 6. A metallic, fixed, half-round, positively-charged electrode 5 will draw hotter sections of the rotatable table 6 while displacing other sections of the rotatable table 6 that have been cooled by discarding heat to a heat sink 3. The drawing in of hotter sections and displacement of cooler sections of the rotatable table 6, results in a continuous motion or spin of the rotatable table 6. As long as heat is applied at the appropriate locations and removed from other appropriate locations of the rotatable table 6, it will rotate. In FIG. 3 a means for converting kinetic energy to work or other useful forms 11 is added (in descriptive block form). In this case, it is a gear or gear train that is used to drive an electric generator. The rotatable table 6 moves the means for converting kinetic energy to work or other useful forms 11 and the energy of the gear, or a set of gears, is converted to electric energy as the electric generator is driven by the gear or the set of gears. So, in this case, the gear or a set of gears that derives momentum and kinetic energy from the rotatable table 6 along with an electric generator comprise the means for converting kinetic energy to work or other useful forms 11. FIG. 4 illustrates cascading of dielectrophoretic heat engine stages. For description purposes, cascaded engine stages are designated by letters ranging from A, the first and hottest stage, down to Z, the last and coolest stage. The three continuation dots signify that there can be many other stages in-between those actually shown. Heat is applied from the heat source 2, moves through each engine stage, and is then discharged eventually to the heat sink 3. Heat is first applied to Stage A from the heat source 2 and Stage A is comprised of dielectric matter with a Curie temperature that is higher (temperature-wise) than the other stages. Waste heat from Stage A is discharged to the next lower stage (temperature-wise), which is stage B, and becomes the heat source for Stage B. Stage B is comprised of dielectric matter with a slightly lower Curie temperature than the dielectric matter in Stage A. Waste heat from Stage B is then discarded to the next lower engine stage to act as the heat source for that next-lower stage and so on, until the heat has moved through all the stages to Stage Z, the final or coolest stage. Stage Z is comprised of dielectric matter that has the lowest Curie temperature of all the stages, and waste heat from Stage Z is finally discarded directly to the heat sink 3. Thus, heat is first applied from the heat source 2 to the dielectric matter in the hottest stage. The heat then moves from one stage to the next where some heat is converted to useful work in each intermediate stage until the waste heat is discarded to the heat sink 3. Since each heat engine stage operates in a short temperature interval around the Curie point of the dielectric matter comprising the particular stage, the Carnot efficiency of each stage is low. However, cascading of engine stages makes much better use of the available heat and thus greatly increases the overall Carnot efficiency of the dielectrophoretic heat engine with cascaded engine stages. The cascading process can take place where the hottest stage may operate at a thousand degrees Centigrade or greater while the lowest stage operates at a temperature close to room temperature or even lower.

CONCLUSIONS, RAMIFICATIONS, AND SCOPE

Accordingly, the reader will see the dielectrophoretic heat engine and associated dielectrophoretic heat cycle that exploit the thermodielectrophoretic effect, can effectively and efficiently convert thermal energy from any source into kinetic energy, mechanical energy, work, or other useful forms. Furthermore, the heat engines and heat cycles exploiting the thermodielectrophoretic effect provide the additional advantages of:
1. permitting the efficient conversion of thermal energy to more useful forms;
2. permitting effective heat engines at very small physical scales to operate and convert thermal energy to more useful forms;
3. allowing heat engines to be developed that are simple with few working parts and that can be cheaply-built;
4. permitting heat engines to convert low-grade heat that is normally wasted into useful work;
5. providing a method for cooling electronic circuits and components with very small dimensions with thermal energy that is first converted to kinetic energy very efficiently;
6. allowing our country to become less-dependent upon foreign sources of non-renewable energy by permitting heat engines that operate more efficiently when converting precious resources into useful work.

Although the description above contains much specificity, this should not be construed as limiting the scope of the invention, but as merely providing illustrations of the presently preferred embodiments of this invention. There are many conceivable embodiments of the present invention, but any heat engine or associated heat cycle operating to convert heat into mechanical energy or more useful forms that is based on the thermodielectrophoretic effect as defined herein, would be construed by a person skilled in the art as being an embodiment or object of the present invention.

Heat can be provided at any temperature and by any source that is sufficient to cause a temperature and permittivity differential between sections, parts, or divisions of dielectric working matter capable of experiencing temperature-dependent permittivity. For very small physical sizes, a micro-dot of radioactive material, such as a radioisotope, would most likely act as the heat source. It has also been shown that subjecting dielectric matter to electromagnetic waves of high frequency affects the dielectric constant of the dielectric matter. That means directly applied electromagnetic energy in the form of rays or waves can be used to cause a temporary variance or difference of the dielectric constant in sections of dielectric matter used in an engine known as the present invention. For example, the dielectric matter comprising a rotatable table in the present invention located just before entering the stationary, positively-charged, top plate can be bombarded with or subjected to microwaves or gamma rays, causing a temporary increase in the dielectric constant of the affected sections of dielectric matter. The affected dielectric matter will then have a greater tendency to be polarized causing the whole rotatable table section to be drawn into the electric field established between the positively-charged and the negatively-charged electrodes. It is conceivable that any matter capable of experiencing temperature-dependent and temperature-variable permittivity can be used as the working matter or substance in the dielectrophoretic heat engine and associated heat cycle that are known as the objects of the present invention. There are, however, certain ferroelectric ceramics and similar substances that experience a large variation in permittivity within a narrow temperature range. For example, the relative permittivity, or dielectric constant of barium titanate (BT) and lead zirconate titanate (PZT) can vary by a magnitude of many thousands of times (or units) within a very narrow temperature range near a Curie point, or Curie temperature of the particular material. By exploiting that characteristic, very powerful dielectrophoretic heat engines can be developed at various physical sizes and scales. It has also been shown that working stages in a dielectrophoretic heat engine can be cascaded in order to improve the Carnot efficiency, the actual conversion efficiency, the effectiveness, or the output power of the engine. The Curie temperatures of various substances can be permanently altered by the addition of other elements, giving a variety of working substances or materials with Curie temperatures (for each substance) that range from very high temperatures to room temperature and below. It is then conceivable that several dielectrophoretic heat engines, where each includes cascaded stages, are also arranged in a cascaded configuration to improve efficiency or power output. It should also be noted that work can be derived directly from each individual cascaded heat engine or each cascaded heat engine stage, but it is also conceivable that the heat engines and heat engine stages can all be "ganged" together on a common central shaft where they all work in unison and the kinetic energy of the rotating, common central shaft is converted to other useful forms with a single means for converting kinetic energy to those more useful forms. It is further conceivable that the dielectric matter, or working "fluid", in the dielectrophoretic heat engine can be of any form, size, or in any physical state. For instance, the temperature-dependent dielectric matter can be in a solid, liquid, or gaseous state as long as one section, segment, or part of the dielectric matter can be drawn into an electric field while other sections, segments, or parts of dielectric matter already within the electric field can be displaced by the dielectric matter being drawn into the electric field. A ribbon and rotatable table were used in the described embodiments of the present invention, but a person skilled in the art would know it is conceivable to use dielectric matter in the form of a belt, a band, a flowing liquid dielectric material, or even a gaseous dielectric matter that is capable of moving through the various stages of the dielectrophoretic heat cycle. With that in mind, it is conceivable to develop pumps that move liquids, gases, or solid matter from one location to another, using concepts that exploit the thermodielectrophoretic effect as defined herein.

The means for converting kinetic energy to more useful forms will depend on the size of the engine components and the particular application. For example, at small physical scales, the working dielectric matter, such as the rotatable table in the description of the preferred embodiment, would experience a large rotational torque, but at a relatively slow rotational speed. A gear train can that significantly increases the rotational speed in order to drive a tiny electric generator can be utilized, where the slow speed of the table is increased hundreds of times. This concept is analogous to a clock spring that is wound very tightly, and where an escapement and gear train are used to drive the 'minutes' and 'seconds' hands of the clock at a much faster rate. Another means for converting kinetic energy of the rotatable table to more useful forms at small physical scales would be a cantilever that is stressed by moving pegs or gear teeth projecting from the rotatable table. The movement of each peg or tooth will apply a force to stress the cantilever in one direction and as the peg or tooth rotates beyond the reach of the stressed cantilever, the cantilever will spring back-and-forth with damped oscillations. The oscillating cantilever can then drive a piezoelectric generator for converting the motion of the cantilever into an electrical output.

Voltage can be applied to the electrodes in a dielectrophoretic heat engine from any source for energizing the positively-charged and the negatively-charged electrodes. At small physical scales, for example, materials from the triboelectric series can be used where electrons are drawn off one electrode and deposited on the other electrode to cause a relatively high potential-difference between the electrodes by simply rubbing or brushing the appropriate moving materials together. Finally, it is conceivable to develop means and methods of cooling electrical or electronic circuits at any physical scale with dielectrophoretic heat engines. For example, the means for converting kinetic energy to more useful forms, in that case, would be comprised of a gear-driven device operating on a refrigeration cycle. It is highly conceivable to devise dielectrophoretic heat engines that use dielectric matter which exhibit the "giant electrocaloric effect". Instead of including a means for converting kinetic energy into more useful forms in that type of engine, heat would instead be moved from one location to another directly by dielectric matter. For instance, one type of dielectric matter can be used for the operation of the engine, while other dielectric matter exhibiting the giant electrocaloric effect that is moved or driven by the first dielectric matter, can be used to move heat from one location to another. It is therefore conceivable to develop dielectrophoretic heat engines that include a means for cooling matter with the work derived from the conversion of thermal energy.

Thus, the scope of this invention should be determined by the appended claims and their legal equivalents, rather than by the examples given.

I claim:

1. A dielectrophoretic heat engine exploiting the thermodielectrophoretic effect for converting thermal energy into work or other useful forms, comprising:
   (a) a heat source, and
   (b) a heat sink, and
   (c) dielectric matter with temperature-dependent electrical permittivity, and
   (d) an electric field established between two oppositely-charged electrical points capable of drawing in said dielectric matter with relatively higher said electrical permittivity while simultaneously displacing said dielectric matter with relatively lower said electrical permittivity from said electric field, and
   (e) means for converting kinetic energy of said dielectric matter moving through said electric field into said work or said other useful forms.

2. The dielectrophoretic heat engine of claim 1 wherein said heat source is comprised of means for supplying electromagnetic energy in the form of electromagnetic waves or electromagnetic rays to said dielectric matter for causing a variance or differential in said electrical permittivity of said dielectric matter in various parts, sections, or segments of said dielectrophoretic heat engine, whereby said electromagnetic energy contained in said electromagnetic waves or said electromagnetic rays is converted by said dielectrophoretic heat engine into said work or said other useful forms.

3. The dielectrophoretic heat engine of claim 1 wherein said heat sink is comprised of a means for cooling or removing heat from matter at any physical scale or size, whereby said heat sink moves or pumps unwanted heat from said matter at one physical location to other said matter at a different physical location.

4. The dielectrophoretic heat engine of claim 1 wherein said dielectric matter with temperature-dependent electrical permittivity is comprised of gaseous matter.

5. The dielectrophoretic heat engine of claim 1 wherein said dielectric matter with temperature-dependent electrical permittivity is comprised of liquid matter.

6. The dielectrophoretic heat engine of claim 1 wherein said dielectric matter with temperature-dependent electrical permittivity is comprised of solid matter.

7. The dielectrophoretic heat engine of claim 1 wherein said dielectric matter with temperature-dependent permittivity is comprised of a flexible belt, a flexible ribbon, a rotatable table, or a rotatable wheel.

8. The dielectrophoretic heat engine of claim 1 wherein said dielectric matter with temperature-dependent permittivity is comprised of said dielectric matter bonded to a rotatable conductive table.

9. The dielectrophoretic heat engine of claim 1 wherein said dielectric matter with temperature-dependent permittivity is comprised of nanotubes, nanowires, or any nano-structure with temperature-dependent permittivity.

10. The dielectrophoretic heat engine of claim 1 wherein said electric field established between two oppositely-charged electrical points capable of drawing in said dielectric matter is generated and maintained by touching, rubbing, or otherwise contacting together, two or more electrically different materials selected from the triboelectric series in order to transfer electronic charges or ions and establish an electric potential difference between two electrical points.

11. The dielectrophoretic heat engine of claim 1 wherein said electric field established between two oppositely-charged electrical points capable of drawing in said dielectric matter is generated and maintained by electromagnetic waves, electromagnetic rays, or electrically-charged particles of matter emitted or transferred from radioactive matter.

12. The dielectrophoretic heat engine of claim 1 wherein said heat source is comprised of radioactive matter capable of emitting or transferring electromagnetic rays, electromagnetic waves, electrically-charged or uncharged particles of matter, or any type of heat-producing emission.

13. The dielectrophoretic heat engine of claim 1 wherein said heat source is solar energy directly derived from the sun and wherein said dielectric matter with said temperature-dependent electrical permittivity has a Curie point near normal room or ambient temperature.

14. A method exploiting the thermodielectrophoretic effect for converting thermal energy into work or other useful forms, comprising:
   (a) providing a dielectrophoretic heat engine exploiting said thermodielectrophoretic effect for converting said thermal energy into more said useful forms comprised of a heat source, a heat sink, dielectric matter with temperature-dependent electrical permittivity, and an electric field established between two oppositely-charged electrical points capable of drawing in said dielectric matter with relatively higher said electrical permittivity while simultaneously displacing said dielectric matter with relatively lower said electrical permittivity, then;
   (b) heating or cooling said dielectric matter for causing a relative increase in said electrical permittivity of said dielectric matter, then
   (c) allowing said electric field to draw in said dielectric matter with relatively higher said electrical permittivity, while
   (d) heating or cooling said dielectric matter inside said electric field for causing a relative decrease in said electrical permittivity of said dielectric matter, then
   (e) allowing said electric field to displace said dielectric matter with said relatively lower electrical permittivity from said electric field, then
   (f) continuously heating or cooling said dielectric matter and allowing said electric field to draw in said dielectric matter with said relatively high electrical permittivity while simultaneously and continuously displacing said dielectric matter with a said relatively lower electrical permittivity from said electric field,
whereby said thermal energy is converted by said dielectrophoretic heat engine into said work or said other useful forms at any physical size or scale.

15. A dielectrophoretic heat engine exploiting the thermodielectrophoretic effect for moving or pumping matter from one physical location to another, comprising:
   (a) a heat source, and
   (b) a heat sink, and
   (c) dielectric matter with temperature-dependent electrical permittivity, and
   (d) an electric field established between two oppositely-charged electrical points capable of drawing in said dielectric matter with relatively higher said electrical permittivity while simultaneously displacing said dielectric matter with relatively lower said electrical permittivity from said electric field,
whereby matter of any physical composition, physical type, physical size, or physical shape is moved or pumped from one physical location to another with heat from said heat source in said dielectrophoretic heat engine.

* * * * *